United States Patent [19]

Driggers

[11] Patent Number: 4,683,361
[45] Date of Patent: Jul. 28, 1987

[54] BRAZING APPARATUS HAVING A DUAL FUNCTION HEATING AND EDDY CURRENT PROBE COIL

[75] Inventor: John M. Driggers, Pittsburgh, Pa.

[73] Assignee: Westinghouse Electric Corp., Pittsburgh, Pa.

[21] Appl. No.: 720,106

[22] Filed: Apr. 4, 1985

[51] Int. Cl.[4] ............................................. H05B 6/06
[52] U.S. Cl. .............................. 219/10.43; 219/10.57; 219/10.77; 219/504; 219/85 R; 324/220; 324/239; 340/686
[58] Field of Search ............... 219/10.77, 10.75, 10.57, 219/10.43, 10.41, 504, 506, 518, 85 BA, 85 BM, 85 A, 85 M, 85 R, 10.49 R, 9.5; 324/220, 219, 239; 340/686

[56] References Cited

U.S. PATENT DOCUMENTS

| | | | |
|---|---|---|---|
| 3,492,453 | 1/1970 | Hurst | 219/10.49 R |
| 3,987,236 | 10/1976 | Kohler et al. | 219/10.77 X |
| 4,341,113 | 7/1982 | Gutzwiller, Jr. | 324/220 X |
| 4,401,945 | 8/1983 | Juengel | 340/686 X |
| 4,413,231 | 11/1983 | Amedro et al. | 324/220 |
| 4,523,177 | 6/1985 | Driggers | 338/303 |
| 4,567,353 | 1/1986 | Aiba | 219/501 |
| 4,572,938 | 2/1986 | Driggers et al. | 338/303 X |
| 4,574,172 | 3/1986 | Burack et al. | 219/10.43 X |

Primary Examiner—Philip H. Leung
Attorney, Agent, or Firm—L. A. DePaul

[57] ABSTRACT

A brazing apparatus and process which utilizes a dual function heating and eddy current probe coil is disclosed herein. The apparatus generally includes a radiant heater assembly having a coil which is capable of both generating radiant heat to effect a braze joint between a reinforcing sleeve and a surrounding tube, as well as serving as an eddy current probe which locates the sections of this sleeve to which the brazing heat should be applied to effect the desired joint. A switching means selectively connects the coil to either a relatively high, heat-generating current, or to the aforementioned alternating current which induces eddy currents within the metal forming the reinforcing sleeve. The apparatus further includes eddy current detection circuitry for monitoring changes in the coil impedance which result from these eddy currents while the coil is slid along the longitudinal axis X of the reinforcing sleeve. In the process of the invention, the edges of the sleeve are accurately located by noting the position of the coil when the coil impedance attains its first and last local maximum values. Both the apparatus and process of the invention are particularly useful in effecting high-quality braze joints in reinforcing sleeves which are brazed within damaged or corroded heat exchange tubes in nuclear steam generators.

28 Claims, 15 Drawing Figures

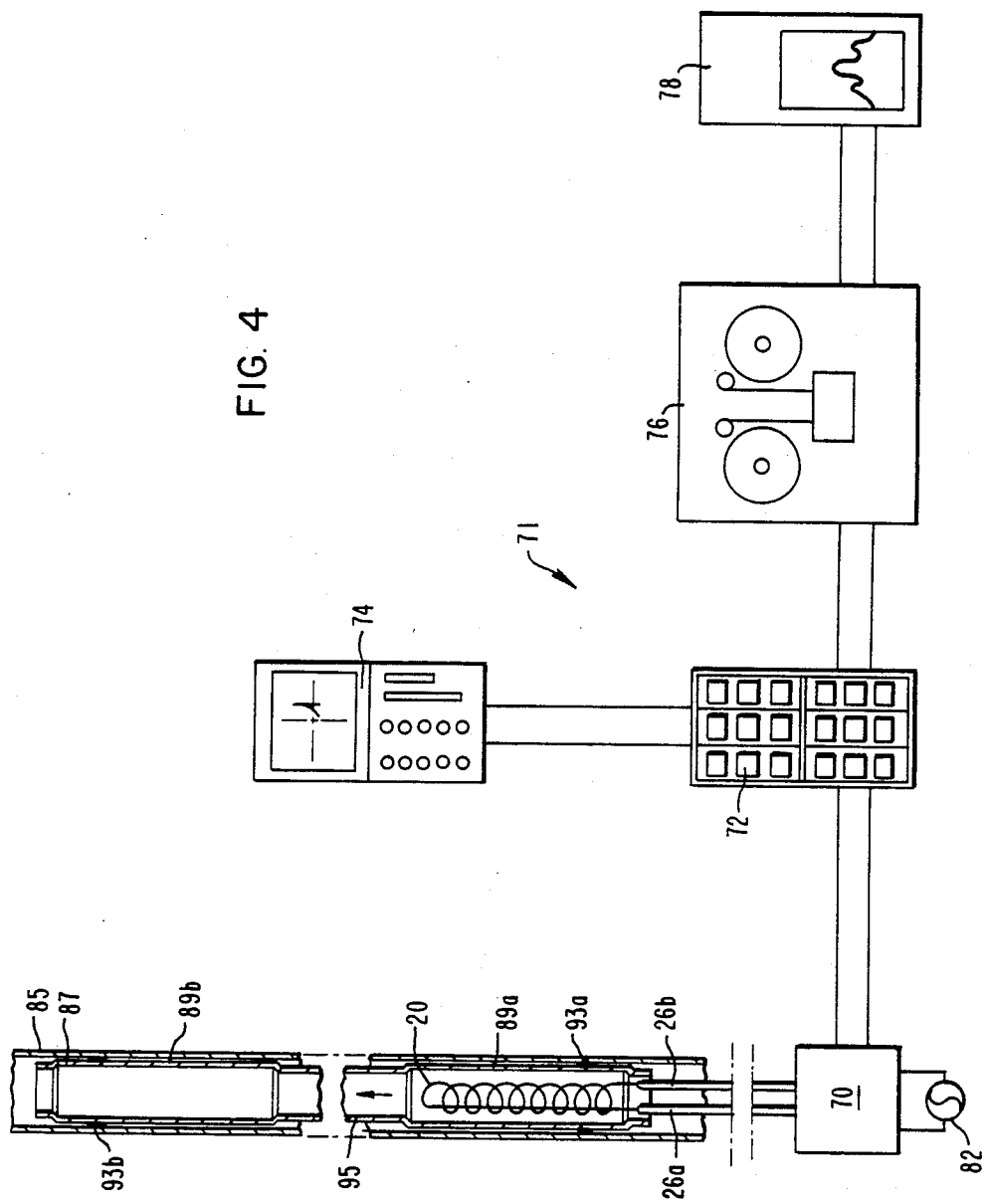

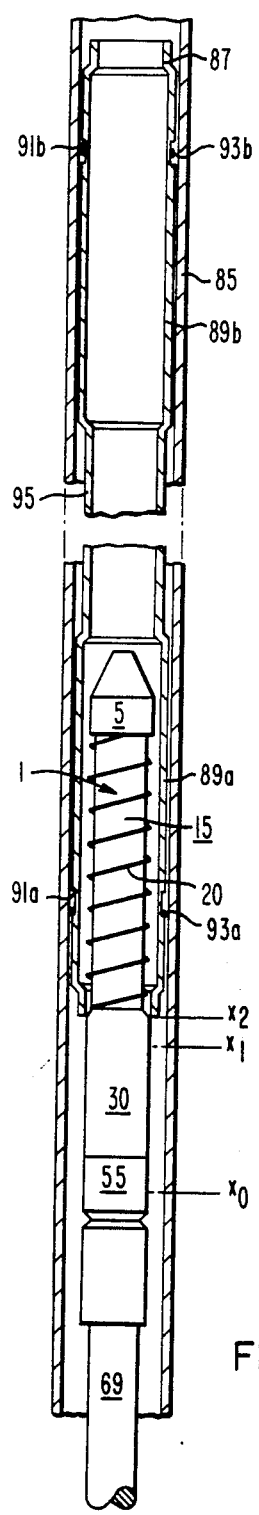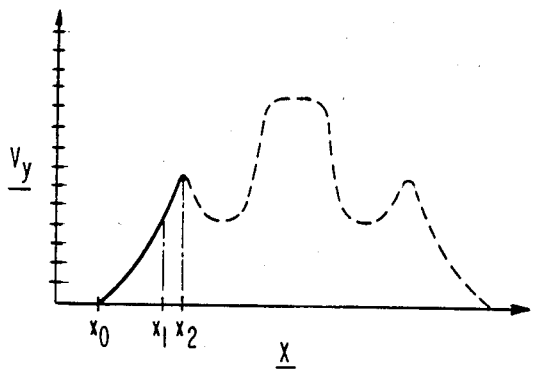
FIG. 6B
FIG. 6A

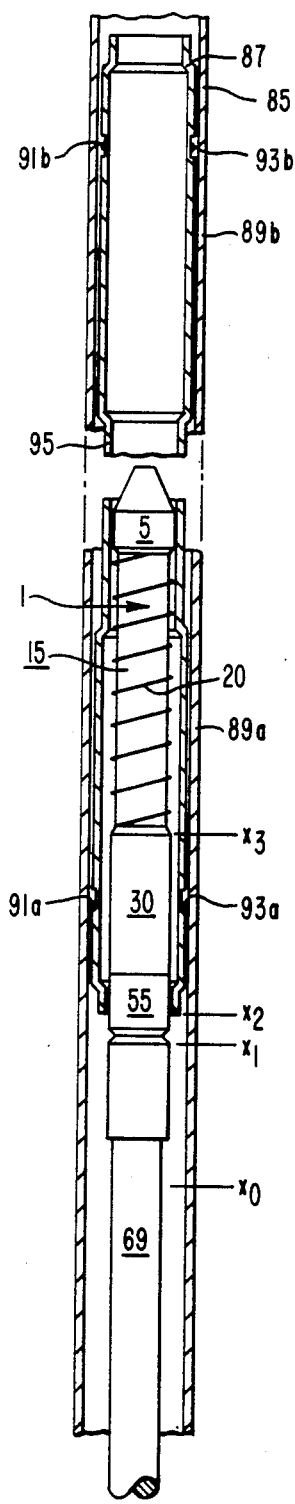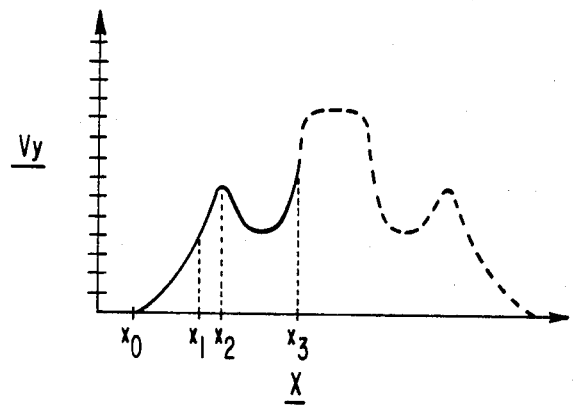
FIG. 7B
FIG. 7A

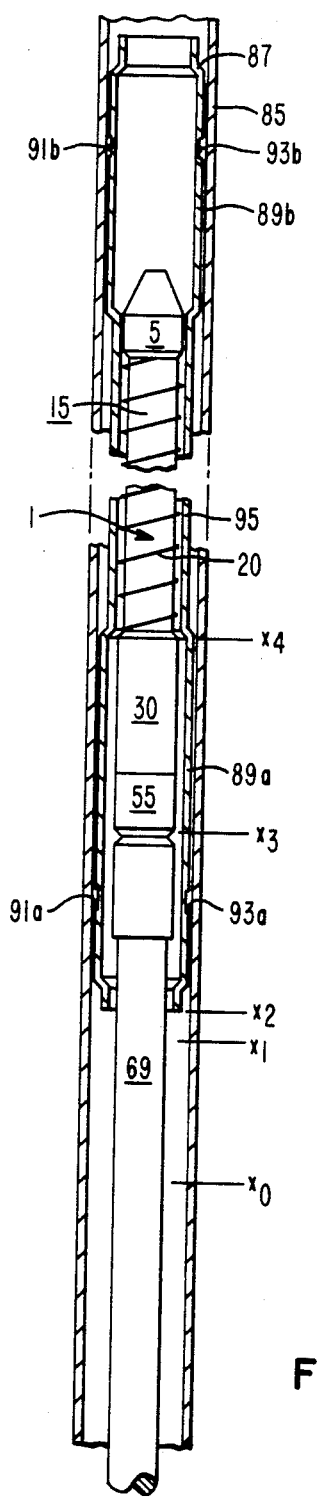
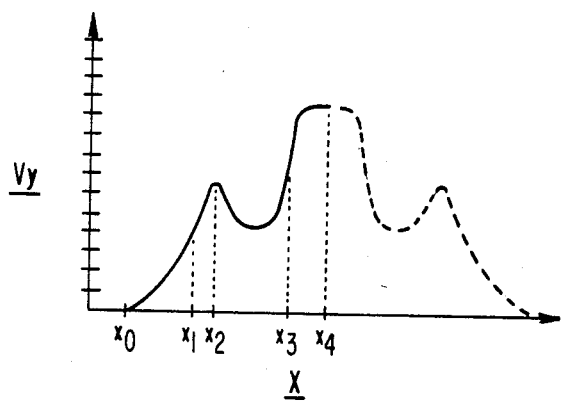
FIG. 8B
FIG. 8A

BRAZING APPARATUS HAVING A DUAL FUNCTION HEATING AND EDDY CURRENT PROBE COIL

BACKGROUND OF THE INVENTION

1. Field of the Invention

This invention relates to a brazing apparatus having an electrical resistance coil which serves the dual functions of providing radiant heat and acting as an eddy current probe. The invention is particularly useful in brazing Inconel reinforcing sleeves within the heat exchange tubes of nuclear steam generators, where the utilization of the coil as an eddy current probe assists the operator in accurately placing the coil into a proper brazing position along the longitudinal axis of the reinforcing sleeve.

2. Description of the Prior Art

Devices and processes for applying a brazing heat to the inside surfaces of conduits are known in the prior art. Such devices and processes are used to braze reinforcing sleeves within the heat exchange tubes of nuclear steam generators. In such prior art processes, a sleeve which is circumscribed at each end by a ring of brazing alloy is inserted into a tube in need of repair and slidably positioned across the section of the tube where the walls have been damaged due to corrosion or denting. The ends of the tube surrounded by the rings of brazing alloy are then usually hydraulically expanded so that they snugly engage the inner walls of the tube being repaired. To complete the joint, a heater assembly formed from an electrical resistance wire coiled around a mandrel is slid up the sleeve and actuated so that the heat generated by the electrical resistance wire melts the rings of brazing alloy disposed between the outer wall of the sleeve and the inner wall of the tube, thereby forming a pair of watertight braze joints between the ends of the sleeve and the tube. Such prior art sleeving operations are frequently performed in the longitudinal sections of the heat exchange tubes which extend through the tubesheet of the nuclear steam generator due to the tendency of the walls of the tubes to corrode, dent and crack in these regions.

One of the problems associated with the implementation of such brazing processes is the accurate and consistent positioning of the electrical resistance coil adjacent to the longitudinal section of the sleeve which includes the ring of brazing alloy. This problem is particularly acute if one desires to sleeve a region of a tube many feet above the tubesheet, such as a support plate region. If the coil is not in proper position when the heating coil is energized, the heating coil might not succeed in transferring a sufficient amount of heat through the walls of the sleeve to properly fuse the surrounding ring of brazing alloy into the annular gap between the outer walls of the reinforcing sleeve and the inner walls of the surrounding tube. Such an incomplete fusing of the brazing alloy could result in a poor-quality braze joint which does not create the desired, watertight seal between the outer walls of the reinforcing sleeve and the inner walls of the surrounding heat exchange tube. In order to solve this problem, eddy current probes have been developed which are capable of precisely locating the edges of the reinforcing sleeves after the ends of the sleeve have been expanded into engagement against the inner walls of the tube being repaired. An example of such an eddy current probe is found in U.S. patent application Ser. No. 615,868 filed May 31, 1984 by John M. Driggers and assigned to Westinghouse Electric Corporation. When such an eddy current probe locates the edge of the sleeve, the distance between the sleeve edge and the mouth of the tube is noted, and used as a point of reference. Since the longitudinal distances between the edges of the sleeve and the rings of brazing alloy which circumscribe them are known, the operator can easily infer the exact distance which he must slide the radiant heater assembly up through the lontigudinal axis of the tube until the center line of the electrical resistance coil is aligned in the desired relationship with one of the rings of brazing alloy.

While the use of eddy current probes in this manner frequently results in a correct and accurate placement of the coil within the sleeve, this system is not completely free from error. Because the eddy current coils used in connection with prior art brazers cannot survive high temperatures, they must be spaced some distance away from the heating element. Such spacing in turn requires the operator to slidably position the heating element in place after locating the edge of the sleeve by means of the eddy current coils. Misalignments can occur as a result from the compliance of the nylon rod used to slide the heater assembly up to a brazing position within the sleeve. Additionally, if a two-step brazing process is to be used for each braze joint, the center line of the heating coil should be within about $\frac{1}{8}''$ of the desired position in both steps of the process. In such a two-step process, the coil is used to thermally expand a longitudinal section of the sleeve which is close to, but which does not include, the ring of brazing alloy in order to prevent a corrosion-bound tube from thermally radially expanding during the brazing heat. The advantages associated with the use of such a two-step brazing process in creating high-quality braze joints are specifically set forth in U.S. patent application Ser. No. 634,336, filed July 13, 1984 now U.S. Pat. No. 4,620,662 by John M. Driggers and assigned to Westinghouse Electric Corporation, the entire specification of which is hereby expressly incorporated herein by reference.

Clearly, there is a need for some means for correctly and reliably positioning the electrical resistance coil of a radiant heater assembly within the reinforcing sleeves used to repair damaged heat exchange tubes in nuclear steam generators, in order to consistently produce high-quality, watertight braze joints between the sleeve and the tube. Ideally, such means should be able to withstand the brazing heat generated by the coil so that the distance between the heating coil and the eddy current sensor can be minimized, and should not be prone to the inaccuracies which result from the compliance of the flexible rods used to slide the heater assembly up and down the longitudinal axis of the sleeve/tube combination.

SUMMARY OF THE INVENTION

In its broadest sense, the invention is both an apparatus and a process for locating the position of a radiant heater assembly within a conduit wherein the heating coil serves the additional function of acting as an eddy current probe.

The apparatus of the invention is a radiant heater assembly which includes a coil for both applying radiant heat to a selected longitudinal section of a conduit such as a metallic sleeve, and for serving as an eddy current probe when an alternating current within a selected frequency range is conducted therethrough. The apparatus further includes a switching means for selectively connecting the leads of the coil to either a relatively high amperage electric current in order to generate radiant heat, or an alternating current within the selected frequency range in order that the coil might be used to locate the edges of the sleeve by monitoring changes in impedance in the coil as it is slid through the sleeve/tube combination. The apparatus may further include a means for moving the coil along the longitudinal axis of the sleeve. Preferably, the moving means will move this coil so that its axis of rotation is substantially parallel to the longitudinal axis of the sleeve when the coil is connected to the alternating current in order that the sleeve edges might be easily detected by eddy current probe techniques. The coil is preferably formed from between 60 to 100 windings of platinum/rhodium electrical resistance wire. Finally, the apparatus of the invention includes eddy current detection circuitry for monitoring the changes in the impedance of the coil to the alternating current flowing therethrough which result from the generation of eddy currents in the conductive material forming the sleeve. As previously indicates, these changes in coil impedance may be used to precisely locate the edges of the sleeve.

The process of the invention generally comprises the steps of conducting an alternating current having a frequency of between about 10 to 10,000 kHz through the radiant heating coil of the heater assembly in order to induce eddy currents in the conduit, and moving the heater assembly along the longitudinal axis of the conduit while monitoring changes in the impedance of the heating coil. When the conduit is an elongated, metallic sleeve which includes expanded portions on either end, the edges of the sleeve may be located when the coil impedance attains its first and last local maximum values. Once the edges of the reinforcing sleeve have been located, the coil of the radiant heater assembly may be accurately positioned near the ring of brazing alloy by short sliding movements since the distances between the edges of the sleeve and the rings of brazing alloy are known to the operator. Since the compliance of the push-rod used to position the heater assembly is negligible for such short sliding movements, the invention significantly improves the ability of the operator to consistently and accurately position the coil at a desired point in the sleeve. This in turn improves the average quality of the resulting braze joints.

Conventional eddy current coils are not able to survive temperatures approaching 2,000° F. The coil of the invention can survive up to 3,000° F. Moreover, because the eddy current sensor is a part of the relatively rigid heater mandrel, inaccuracies due to mechanical compliance are eliminated.

BRIEF DESCRIPTION OF THE SEVERAL FIGURES

FIG. 4 is a schematic diagram of the heater assembly, switching circuit, eddy current circuitry, and power source of the invention;

FIGS. 6A and 6B illustrate the heater assembly with the proximal end of its electrical resistance coil in alignment with the proximal end of the reinforcing sleeve, and the corresponding readout of the strip recorder of the eddy current circuitry, respectively;

Figure 1:
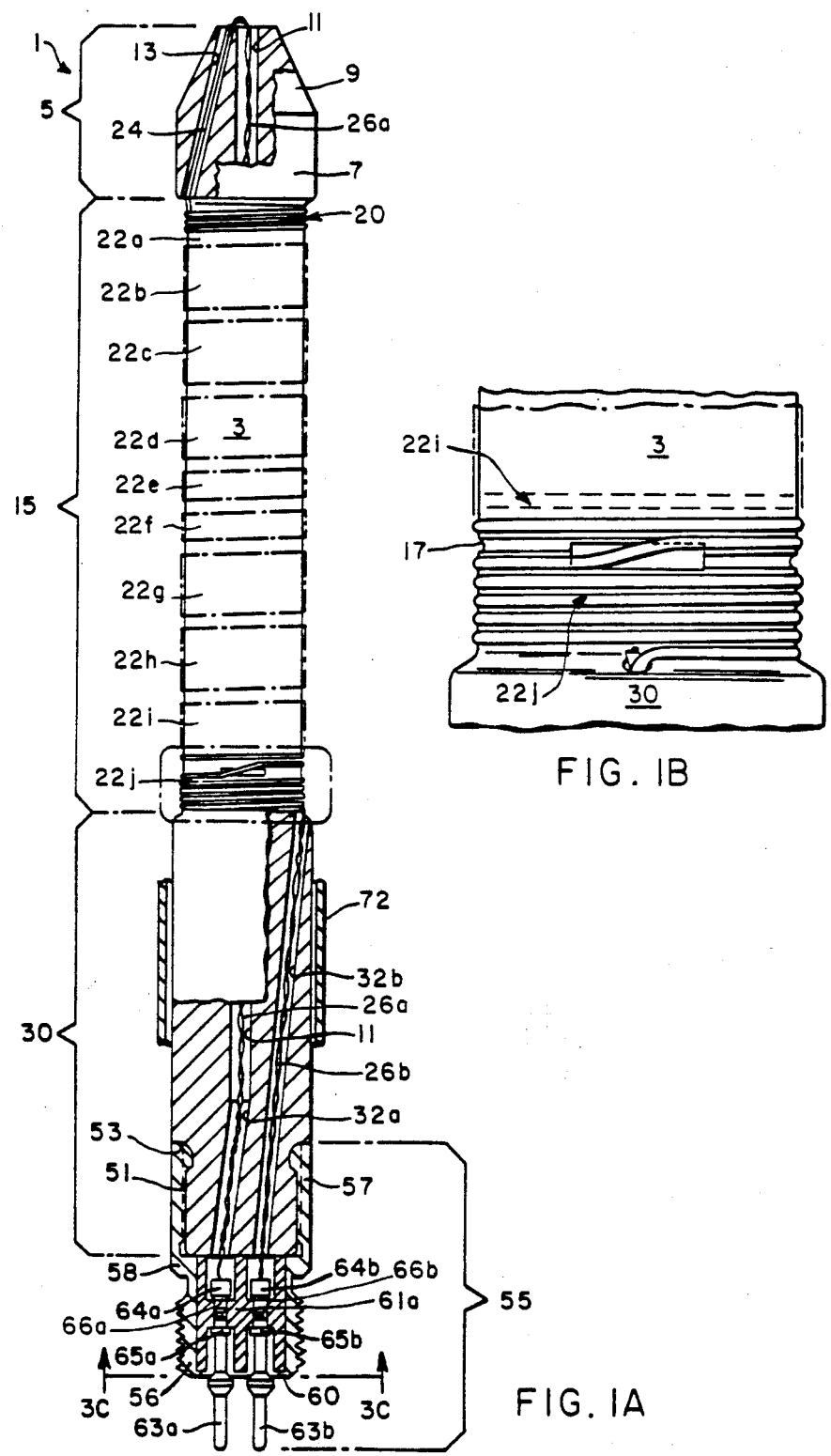
FIG. 1A is a partial-sectional side view of the heater assembly of the invention.
FIG. 1B is an enlarged view of the circled area of FIG. 1A.

FIGS. 7A and 7B illustrate the electrical resistance coil of the heater assembly being slid between the lower expanded portion of the sleeve and the central unexpanded portion of the sleeve, and the corresponding readout of the strip recorder of the eddy current circuitry, respectively, and FIGS. 8A and 8B illustrate the heater assembly positioned so that the proximal end of its electrical resistance coil is aligned with the proximal end of the unexpanded portion of the sleeve, and the corresponding readout of the strip recorder of the eddy current circuitry.

DETAILED DESCRIPTION OF THE PREFERRED EMBODIMENT

With reference now to FIGS. 1A, 1B and 4, wherein like numerals refer to like components, the heater assembly 1 of the invention generally comprises a mandrel formed from a heat-resistant refractory material, such as boron nitride, having a central portion 15 onto which a coil 20 of electrical resistance wire is wound. As may best be seen with reference to FIG. 4, the two lead wires 26a, 26b of the coil 20 are connected to a switching circuit 70 which includes a double pole, double throw switch. Circuit 70 in turn is connected both to the output of the output current of an eddy current circuit 71, and an A.C. power source 82. As will be described in more detail hereinafter, the switching circuit 70 is capable of connecting the leads 26a, 26b of the coil 20 to either the relatively low-amperage, high-frequency alternating current generated by the tester 72 of the eddy current circuit 71, or to the relatively high-amperage, low-frequency output of the A.C. power source 82, depending upon whether the coil 20 is being utilized as an eddy current probe to locate the edges of the sleeve 87, or as a radiant heater coil for fusing the rings of brazing alloy 93a, 93b in the annular space between the tube 85 and the reinforcing sleeve 87.

Turning now to a more specific description of the heater assembly 1, the mandrel 3 further has an enlarged leading shoulder 5 having a cylindrical portion 7 which terminates in a frustro-conical end 9. Leading shoulder 5 includes both a centrally disposed bore 11 and a laterally disposed bore 13. Bore 11 accommodates braided lead wire 26a of the coil 20, while bore 13 houses connector wire 24 of this coil. Centrally disposed bore 11 does not terminate at the proximal end of the leading shoulder 5, but extends completely through the generally cylindrical body of the mandrel 3, and well into the trailing shoulder 30, where it connects with an angled bore 34a which houses braided lead wire 26a. As used herein, the words "proximal" and "distal" are used from the perspective of the operator, who manipulates the heater assembly by means of a nylon push-rod 69 connected to the lead-wire end of the mandrel 3. The mandrel 3 further includes a generally cylindrical central portion 15 disposed between the previously described leading shoulder 5, and a trailing shoulder 30. As is indicated in FIG. 1, the centrally disposed portion 15 of the mandrel 3 accommodates the windings of the heater coil 20. The provision of the enlarged shoulders 5 and 30 on either side of the smaller-diameter central portion 15 of the mandrel 3 serves three important functions. First, since these shoulders 5 and 30 are formed from a heat-insulating substance, the inner edges of these shoulders define fairly sharp limits in the longitudinal shape of the heating zone generated by the coil 20. This feature renders the heater assembly 1 particularly useful in carrying out the two-step brazing process described and claimed in previously mentioned patent application Ser. No. 634,336, since proper implementation of this process requires that the brazing heat be accurately applied along specific longitudinal sections of the sleeve. Secondly, these shoulders 5 and 30 help concentrically space the windings of the coil 20 from the inside walls of the sleeve or other conduit being brazed so that the coil applies uniform heat at all points along its diameter. Thirdly, these shoulders 5 and 30 prevent the windings of the coil 20 from inadvertently rubbing against the inner walls of the sleeve when the heater assembly is slid up and down the tube, which could bunch up the coil windings into a non-uniform configuration.

As may best be seen in FIG. 1B, the generally cylindrical central portion of the mandrel 3 includes a plurality of helically disposed grooves 17 disposed around its exterior surface. Each of these grooves 17 receives one of the windings of the heater coil 20. The function of these grooves 17 is to reinforce the function of the enlarged shoulders 5 and 30 in preventing the windings of the coil 20 from becoming bunched up or otherwise longitudinally displaced as a result of any incidental friction that the windings experience as the heater assembly 1 is slid through a sleeve/tube combination. Such bunching up of the coil windings could create short circuits in the coil 20, which in turn could form undesirable "hot spots" in the central portion 15 of the mandrel 3. Such "hot spots" could ultimately weaken the material forming the mandrel 3, and create non-uniformities in the pattern of heat flux generated by the coil 20. As a further precaution against the formation of such "hot spots", the coil 20 is preferably subdivided into a series of serially-spaced coil sections 22a through 22j, each of which is separated from its neighbors by a small, heat-dissipating gap. Each coil section is preferably about 0.550 in. in diameter, which leaves a radial clearance of about 0.115 in. between the coil 20 and the inner wall of the sleeve 87.

At its distal end, the coil 20 continues in the form of the aforementioned wire 24 which in turn becomes connected to the previously mentioned braided lead wire 26a. At its proximal end, the last coil section 22j becomes a braided lead wire 26b. The use of braided lead wires 26a and 26b (each of which is twisted about 12 to 13 times per inch) is preferable over single-filament type lead wires due to their superior strength, reduced resistance heating, and superior thermal characteristics. As will be described in more detail hereinafter, the braided lead wires 26a and 26b each ultimately extend out of the proximal end of the trailing shoulder 30, where they are connected to the pins of a connector assembly 55. The coil 20 is preferably formed from a platinum-rhodium wire of approximately 0.020 in. in diameter which includes 70% platinum and 30% rhodium, although an alloy of anywhere between 70% to 90% platinum and 10% to 30% rhodium may be used. The advantages associated with the use of braided lead wires, spaced coil sections, and platinum-rhodium alloy wire in the heating coil 20 are specifically set forth in U.S. patent applications Ser. Nos. 571,214 and 571,215, now U.S. Pat. No. 4,523,177, now U.S. Pat. No. 4,572,938 filed by John M. Driggers and John M. Driggers et al, respectively, on Jan. 16, 1984 and assigned to Westinghouse Electric Corporation. Both of these patent specifications are hereby expressly incorporated herein by reference.

The third major section of the mandrel 3 of the heater assembly 1 is the previously mentioned enlarged, generally cylindrical trailing shoulder 30. Shoulder 30 includes a pair of bores 32a and 32b for receiving the aforementioned braided lead wires 26a and 26b, respectively. As previously indicated, lead wire bore 32a communicates with the proximal end of the centrally disposed bore 11 which runs almost completely through the axis of rotation of the mandrel 3. Braided lead wire bore 32a is traversely disposed to the centrally disposed bore 11 at a small angle, as shown, in order to provide a sufficient amount of electrically insulating mandrel material between the two braided lead wire bores 32a and 32b so that short-circuiting does not inadvertently occur between the lead wires 26a and 26b housed therein.

Figure 2:
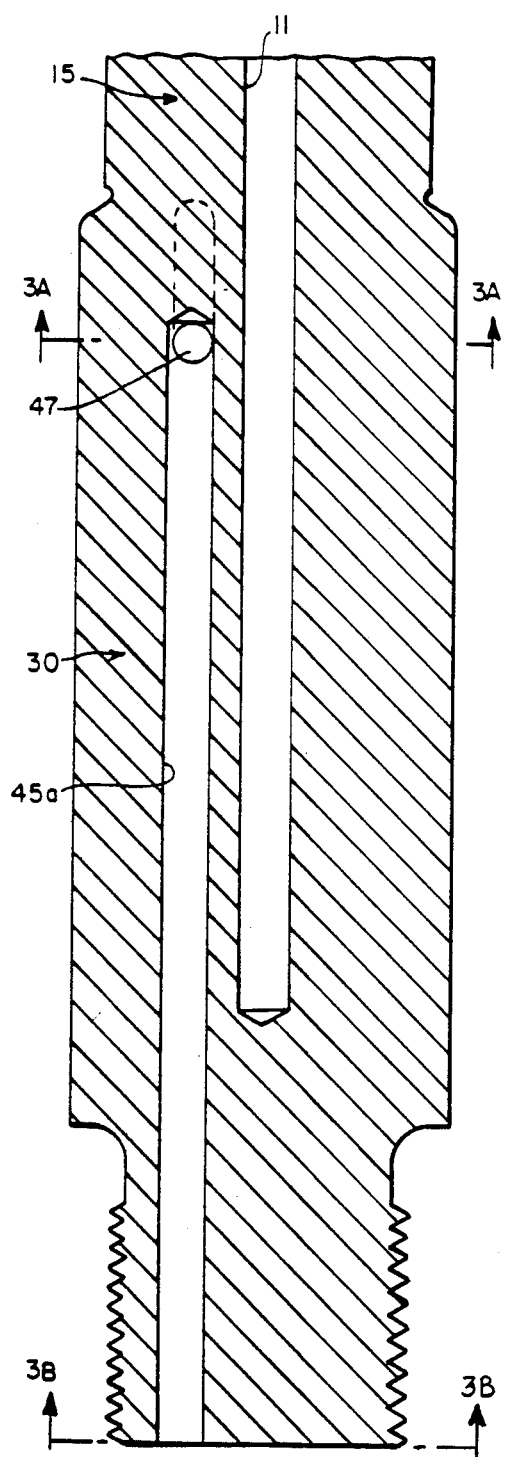
FIG. 2 is a cross-sectional side view of the trailing shoulder of the heater assembly of the invention, rotated 90° from the position in which it is shown in FIG. 1A.
Figure 3A:
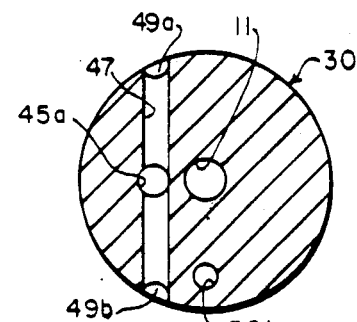
FIG. 3A is a cross-sectional view of the trailing shoulder of this heater assembly taken along line A—A in FIG. 2.
Figure 3B:
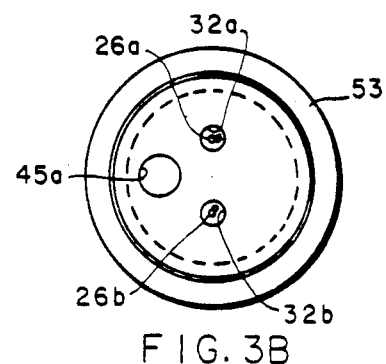
FIG. 3B is another cross-sectional view of the trailing shoulder of this heater assembly taken along line B—B of FIG. 2.

With reference now to FIGS. 2, 3A and 3B, the trailing shoulder of the mandrel 3 also includes a longitudinally disposed gas bore 45a for conducting an air-purging flow of inert gas (preferably helium) around the body of the mandrel 3 during the heating process. The provision of such a flow of inert gas has at least three advantages. First, it prevents the heat-insulating refractory material which forms the central portion 15 of the mandrel from reacting with ambient atmospheric oxygen during the brazing process, which in turn lengthens the useful lifespan of the mandrel 3. Second, when the coil is energized, this flow helps conduct heat from the coil windings to the inner surface of the sleeve 87. Finally, when the coil 20 is de-energized, this flow is increased to help cool off the mandrel 3 of the heater assembly 1, which in turn helps prevent the various components of the assembly 1 from becoming overheated. With specific reference now to FIGS. 2 and 3A, this longitudinally disposed gas bore 45a terminates at its distal end into the midpoint of a chordally oriented bore 47. Each of the ends of the bore 47 in turn terminates in short flutes 49a and 49b which longitudinally extend up the outer surface of the trailing shoulder 30 to the junction between the top of the shoulder 30 and the bottom of the heating coil 20. These flutes 49a and 49b coact with the inner surfaces of the reinforcing sleeve to advantageously divert the flow of inert gas from a lateral direction out of the ends of the chordally oriented bore 47 to a generally longitudinal direction, in order that the inert gas might effectively purge the ambient atmospheric gas surrounding the coil-holding central portion 15 of the mandrel 3. The trailing shoulder 30 of the mandrel 3 terminates in a threaded end portion 51 which is circumscribed by an annular shoulder 53 at its distal end for a purpose which will become evident presently. While the leading shoulder 5, the central portion 15, and the trailing shoulder 30 of the mandrel 3 are all integrally formed from a generally cylindrical piece of 99.9% pure boron nitride (which is preferably diffusion bonded), other refractory materials (such as zirconia and alumina) may also be used. However, the use of boron nitride is preferred due to the fact it is generally easier to machine and is believed to have better thermal shock resistant characteristics. Additionally, the coefficient of thermal expansion of boron nitride is compatible with the coefficient of thermal expansion of a heating coil formed from a platinum-rhodium alloy.

With reference again to FIG. 1, the threaded end portion 51 of the trailing shoulder 30 of the mandrel 3 is threadedly engaged to a connector assembly 55. The overall function of the connector assembly 55 is to form a solid mechanical and electrical connection between the braided lead wires 26a and 26b and electrical connector pins 63a and 63b. In the preferred embodiment, these terminal pins 63a and 63b are plugged into the outlet of a novel support mandrel (not shown) which is described and claimed in a concurrently filed U.S. patent application entitled "Improved Braze Heater Assembly", Ser. No. 720,106 filed Apr. 4, 1985 by William E. Pirl and John M. Driggers. Connector assembly 55 generally includes an externally threaded housing member 56 having an internally threaded, cylindrical skirt 57 extending therefrom. The distal end of housing member 56 and the proximal end of the cylindrical skirt 57 are mutually connected through annular shoulder 58. Like skirt 57, the housing member 56 is essentially hollow, and includes a cylindrically shaped space 59 for housing a pair of semi-cylindrical insulating pieces 61a and 61b preferably formed from boron nitride. Additionally, the proximal end of the housing member 56 terminates in an annular capturing flange 60 which secures the semi-cylindrical pieces 61a, 61b within the housing member 56. The housing member 56, cylindrical skirt 57 and annular shoulder 58 are all integrally formed from No. 300 stainless steel due to its corrosion resistance and favorable machining characteristics.

Figure 3C:
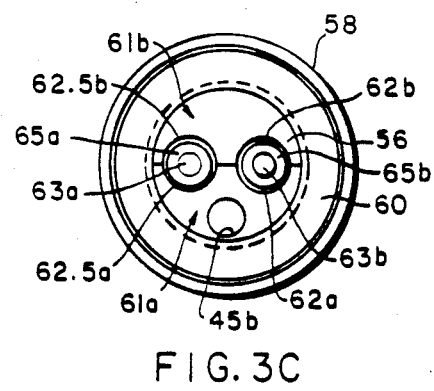
FIG. 3C is a further cross-sectional view of this trailing shoulder taken along line C—C of FIG. 1A.

As may best be seen with reference to FIGS. 1 and 3C, each of the aforementioned semi-cylindrical insulating pieces 61a and 61b includes a pair of parallel, semi-circular grooves 62a, 62.5a and 62b, 62.5b on its flat face for receiving the crimp contacts 64a and 64b of the terminal pins 63a and 63b, respectively. These grooves 62a, 62b and 62.5a, 62.5b are mutually registrable when the flat faces of the two semi-cylindrical insulating pieces 61a and 61b are abutted against one another to form a single, cylindrically shaped insulator member which may be captured between the proximal end of the mandrel 3 and the capturing flange 60 of the housing member 56. When the two semi-cylindrical insulating pieces 61a and 61b are so positioned, the two pairs of semi-cylindrical bores 62a, 62b and 62.5a, 62.5b form the equivalent of two parallel bores which extend along the longitudinal axis of the mandrel 3. Additionally, semi-cylindrical insulating piece 61a includes a bore 45b which is registrable with gas bore 45a of the mandrel 3 when the housing member 56 is screwed into position on the threaded end portion 51 of the mandrel 3. As is best seen in FIG. 1, each of the bores formed from the semi-cylindrical bores 62a, 62b and 62.5a, 62.5b is recessed at its proximal and distal end in order to complement the shape of the pins 63a and 63b, each of which includes an upper stop shoulder 66a, 66b and a lower stop shoulder 65a, 65b. These upper and lower stop shoulders 66a, 66b and 65a, 65b, respectively, serve to lock each of the pins 63a, 63b in the single, cylindrical insulator member formed when the flat sides of the two semi-cylindrical insulating pieces 61a and 61b are abutted together and captured within the cylindrical space inside the housing member 56. An electrical and mechanical connection is formed between each of the pins 63a and 63b and its corresponding braided lead wire 26a, 26b by inserting the lead wire within its respective crimp contact 64a, 64b, and squeezing the center of the crimp contacts with an appropriate crimping tool. In the preferred embodiment, each of the pins 63a, 63b (and their associated crimp contacts 64a, 64b) is formed from gold-plated copper. Additionally, after the crimp connection between the braided lead wires 26a and 26b and their respective pins 63a, 63b is made, the housing member 56 is preferably screwed onto the threaded end portion 51 of the trailing shoulder 30 in the position shown in FIG. 1 until the distal edge of the cylindrical skirt 57 abuts the annular shoulder 53 in the trailing mandrel shoulder 30, and the annular shoulder 58 firmly engages the proximal end of the shoulder 30. Such threaded engagement between the housing member 56 and the threaded end portion 51 of the trailing shoulder 30 of the mandrel 3 achieves two purposes. First, such positioning firmly secures the cylindrically shaped insulator formed from the two semi-cylindrical insulating pieces 61a, 61b between the capturing flange 60 and the proximal end of the mandrel 3. Secondly, such engagement serves to equilibrate any shear forces which the housing member 56 and cylindrical skirt 57 might apply onto the end of the trailing shoulder 30 of the mandrel 3 when the heater assembly 1 is pushed through various sections of a sleeve/tube combination. This force-equilibrating function is important, as the boron nitride from which the mandrel 3 is preferably formed tends to be brittle. As previously indicated, the proximal end of the connector assembly 55 is connected to a nylon push-rod 69 through a novel support mandrel (not shown) which includes a centering mechanism formed from a proximal and a distal roller assembly, each of which includes three spring-loaded rollers spaced 120° apart. Details of the structure of this support mandrel are contained in a U.S. patent application Ser. No. 720,107 filed Apr. 4, 1985 entitled "Improved Braze Heater Assembly", filed concurrently with this application by William E. Pirl and John M. Driggers, the entire text of which is hereby expressly incorporated herein by reference.

With reference now to FIG. 4, the braided lead wires 26a, 26b of the coil 20 are connected to a switching circuit 70, which is in turn connected to the output of an eddy current circuit 71, and a source of A.C. power 82. The preferred eddy current circuit 71 used is a MIZ-12 frequency multiplier, manufactured by Zetec, Inc., of Isaquah, Wash. This eddy current circuit includes a tester 72 capable of generating A.C. currents of different frequencies and conducting them to the braided leads 26a, 26b of the coil 20 via switching circuit 70. An oscilloscope 74 is electrically connected across the input and output leads of the tester 72, as are tape recorder 76 and strip recorder 78. Both the oscilloscope 74 and strip recorder 78 provide a visual readout of the fluctuations in the impedance of the coil 20 as the heater assembly 1 is slid along the longitudinal axis of a reinforcing sleeve 87 which is concentrically disposed within the tube 85 being repaired. In the oscilloscope presentation of these impedance fluctuations, absolute changes in the impedance are indicated merely by variations in the length of a spike along the Y axis in the oscilloscope screen. By contrast, in the strip recorder 78, these variations in impedance may be more easily correlated to the position of the coil 20 along the longitudinal axis of the sleeve 87, since the strip recorder provides a continuous history of the impedance variations as the coil 20 is slid up along the longitudinal axis of the sleeve 87. More specifically, and with reference now to FIGS. 5A and 5B, when the coil 20 of the heater assembly 1 is initially inserted into the proximal portion of sleeve 87, the amount of electromagnetic coupling which occurs between the fluctuating magnetic field radiated by the coil and the metallic walls of the reinforcing sleeve 87 will create eddy current fields in the sleeve 87 which will increase the amount of inductive impedance the alternating current experiences as it flows through the windings of the coil 20. In both the oscilloscope presentation and in the strip recorder 78, these increases in impedance are indicated in terms of a vertical voltage component Vy. In order to maximize the resolution of the eddy current probe formed by the coil 20 in the eddy current generator 71, the tester 72 is adjusted so that it generates an alternating current having a frequency of between 900 to 990 kHz. The radial extent to which most of the resulting lines of magnetic flux surrounding the coil penetrate a surrounding conductive medium is dependent upon the frequency of the alternating current flowing through the coil 20. If the frequency of the current is adjusted somewhere between 900 and 990 kHz, the radius of the fluctuating magnetic field will be dimensioned so that an optimal amount of electromagnetic coupling occurs between the lines of flux of the field and the surrounding metallic sleeve. The use of a lower frequency would result in a larger radius field whose flux lines may penetrate beyond the sleeve radius and interact with the surrounding tube 85, and even the tubesheet or support plates (not shown) in the steam generator. Use of a higher frequency would generate a field wherein fewer of the lines of magnetic flux did not quite extend to the sleeve walls. Hence, the use of a field of between about 900 to 990 kHz maximizes the resolution of the coil 20 when it functions as an eddy current probe. While a 900 to 990 kHz is preferred, the invention would still be operable with frequencies as low as 10 kHz and as high as 10,000 kHz, albeit at a loss of resolution. Moreover, it should be noted that the optimal frequency will vary as a function of both the physical and electrical characteristics of the eddy current probe used, and the surrounding metallic conduit with which it interacts.

With reference now to FIGS. 5A, 5B, 6A, 6B, 7A, 7B, 8A and 8B, the preferred process of the invention generally comprises four steps. First, the proximal end of the sleeve 87 is located by using the coil 20 as an eddy current probe. This is accomplished by adjusting the state of the switching circuit 70 to connect the leads 26a and 26b of the coil 20 to the low amperage, alternating current generated by the tester 72 of the eddy current circuit 71, while sliding the heater assembly 1 through the proximal expanded portion 89a of the sleeve 87. Next, the coil 20 is used as a radiant heater in order to effect a braze joint between the distal, enlarged portion 89b of the sleeve 87 and the surrounding tube 85. This is generally accomplished by properly positioning the coil 20 near the ring of brazing alloy 93b, and using the switching circuit 70 to disconnect the coil leads 26a and 26b from the eddy current circuit 71 and to connect them instead to the A.C. power source 82. Third, the coil 20 is again used as an eddy current probe to locate the distal end of the sleeve 87. This is accomplished by again switching the state of the switching circuit 70, and pushing the entire heater assembly completely through the sleeve 87, and withdrawing it while the relatively low amperage, high frequency alternating current generated by the tester 72 flows therethrough. Once this is accomplished, a braze joint is created between the proximal, enlarged end 89a by again using the coil 20 as a radiant heater. In both the proximal and distal expanded portions 89a, 89b of the sleeve 87, the above two-step brazing operation is preferably accomplished by means of the previously referenced two-step brazing process. The technique of locating the proximal end of the sleeve 87 as a point of reference for effecting the braze joint between the distal end 89b of the sleeve 87 and the tube 85 (and vice versa) allows the operator of the invention to create this first braze joint by means of a series of pushing movements only (and the second braze joint by a series of pulling motions only), thereby minimizing inaccuracies in the placement of the heater mandrel 3 due to the compliance of the nylon rod 69. Stated another way, if the proximal end of the sleeve 87 were located and used as the point of reference for the proximal braze joint, the operator of the heater assembly would have to use a series of push-pull movements (if the two-step brazing process were used), which would alternately compress and stretch nylon rod 69, therely introducing inaccuracies in the placement of the heater mandrel 3 due to compliance.

Figure 5A:
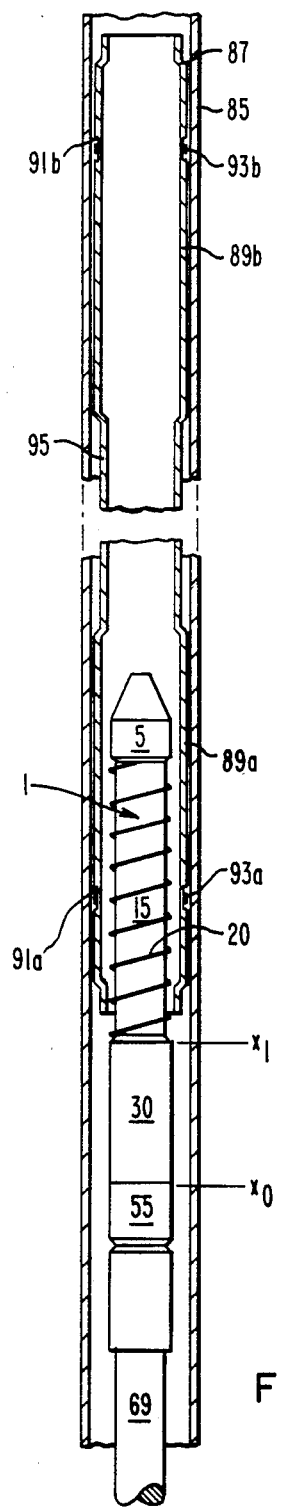
FIGS. 5A and 5B illustrate the heater assembly being inserted into the proximal end of a reinforcing sleeve, and the corresponding readout of the strip recorder of the eddy current circuitry, respectively.
Figure 5B:
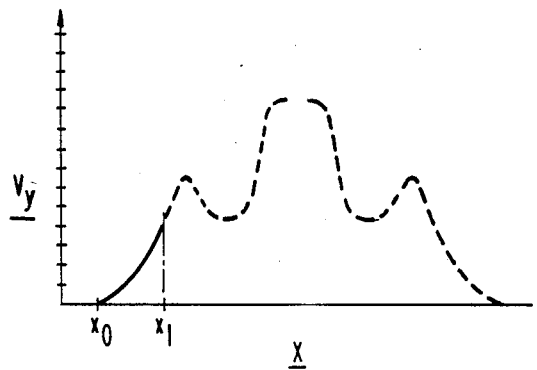

With specific reference now to FIGS. 5A and 5B, the heater assembly 1 of the invention is pushed up along the longitudinal axis of the tube 85 in the vicinity of the sleeve/tube combination. The longitudinal sliding of the heater assembly 1 is accomplished by means of a nylon positioning rod 69 which is mechanically connected to the proximal end of the heater assembly 1. At this point in time, the state of the switching circuit 70 is adjusted so that only the relatively low amperage, high frequency alternating current generated by the tester 72 is passing through the coil 20. As the heater assembly becomes more and more deeply inserted through the end of the sleeve 87, the fluctuating magnetic field surrounding the coil 20 forms larger and larger amounts of eddy currents within the Inconel forming the sleeve. These eddy currents in turn exert a reactive inductance on the alternating current flowing through the coil which increases as the coil is inserted deeper into the proximal end of the sleeve 87. Since the y component of the voltage monitored by both the oscilloscope 74 and the strip recorder 78 is proportional to this increase in reactive inductance, the resulting graph generated by the strip recorder 78 shows a sharply ascending line when the trailing edge of coil 20 is at point X1 along the longitudinal axis of the tube 85.

With reference now to FIGS. 6A and 6B, the line charted by the strip recorder 78 peaks into a local maximum when the trailing edge of the coil 20 becomes aligned with the proximal edge of the sleeve 87 at point X2 along the longitudinal axis of the tube 85. The precise location of this local maximum is easily confirmed by using the nylon push-rod 69 to continue the movement of the heater assembly 1 along the longitudinal axis of the tube 85, as is illustrated in FIGS. 7A and 7B. Interestingly, once the trailing edge of the coil 20 is inserted beyond the proximal edge of the sleeve 72, the amount of reactive impedance generated in the coil 20 by virtue of the resulting eddy currents dimishes somewhat, which in turn results in the graph illustrated in FIG. 7B. This first local maximum occurs as a result of the shape of a proximal end of the sleeve 87. As is evident in FIG. 5A, the proximal end of the sleeve 87 includes a relatively short, unexpanded portion of the sleeve between the proximal edge of the sleeve and the proximal expanded portion 89a of the sleeve. Since the smaller radius of this unexpanded portion of the sleeve 87 results in a greater amount of electromagnetic coupling between the coil 20 and the sleeve 87 along this section of the sleeve, the total amount of such coupling reaches a local maximum when the entire length of the unexpanded proximal portion of the sleeve 87 is adjacent to the proximal end of the coil 20 while the balance of the coil 20 is adjacent to the expanded proximal portion 89a of the sleeve 87, as illustrated in FIG. 5A. However, when the coil 20 is inserted deeper into the sleeve 87, as illustrated in FIG. 7A, the amount of coil 20 which is adjacent to the smaller-radiused, unexpanded proximal end of the sleeve 87 diminishes while the amount of coil adjacent to the proximal expanded portion 89a increases. Therefore, the total amount of electromagnetic coupling between the sleeve 87 and the coil 20 falls off, as is illustrated in FIG. 7B. Once the trailing edge of the coil 20 is pushed past the proximal edge of the sleeve 87, the operator is left with a fairly sharply defined peak on the graph generated by the strip recorder 78, which accurately informs him of the location of the proximal edge of the sleeve 87. Using the edge of the sleeve 87 as a reference point, the operator may then accurately position the center line of the coil 20 into a brazing position adjacent to the ring of brazing alloy 93b which circumscribes the distal expanded portion 89b of the sleeve 87. The operator then changes the state of the switching circuit 70 so that the coil 20 is disconnected from the low amperage, high frequency current generated by the eddy current 71, and is instead connected to the relatively high amperage, low frequency alternating current generated by the A.C. power source 82. This in turn causes the coil 20 to generate the radiant heat necessary both to thermally expand the tube 85 surrounding the sleeve 87 as well as to melt the ring of brazing alloy 93a which circumscribes the expanded end 89a of the sleeve 87 if the preferred, two-step brazing process is used.

After the braze joint between the tube 85 and the proximal expanded end 89b of the sleeve 87 has been completed, the operator changes the state of the switching circuit 70 so that the coil 20 is reconnected to the low amperage, high frequency current generated by the eddy current circuity 71, and disconnected from the relatively high amperage, low frequency alternating current generated by the power source 82. Once the coil 20 has been heated by the source of high amperage current 82, it is not necessary to wait for it to cool completely before it may be used again as an eddy current probe, since the detection signal depends only on a relative maximum impedance signal, and not a fixed impedance value. The operator again uses the nylon push-rod 69 to slide the coil 20 completely through the sleeve/tube combination. When the center line of the coil 20 is aligned near the center of the central, unexpanded portion of the sleeve 95, the strip recorder records a second maximum at point X4 as illustrated in the graph of FIG. 8B. It is believed that the second maximum is greater than the first due to the fact that a greater length of the coil 20 is positioned adjacent to a section of smaller-radiused, unexpanded sleeving. As is indicated in the dotted portion of the graph of FIG. 8B, a third and last local maximum is recorded when the leading edge of the coil 20 is finally aligned with the distal edge of the sleeve 87 at a point X5 along the longitudinal axis of the tube 85. It is believed that this third local maximum occurs for the same reasons as given for the first local maximum at point X2 along the longitudinal axis of the tube 85. Confirmation of the location of this third and last local maximum may again be made by merely continuing to push the heater assembly 1 beyond the point X5 so that the coil 20 passes completely through the sleeve/tube combination. Once the operator has confirmed the location of the distal end of the sleeve 85 in this manner, he may again use the switching circuit 70 to disconnect the coil 20 from the low amperage, high frequency current produced by the tester 82 of the eddy current circuit 71, and reconnect the coil to the high amperage A.C. power source 82. Using the distal edge of the sleeve 87 as a reference point, and knowing the distance of the ring of brazing alloy 93a from this edge, the operator may proceed to effect a braze joint between the proximal expanded portion 89a of the sleeve 87 and the surrounding tube 85 by pulling the heater assembly 1 into a proper position back into the sleeve 87. Again, since only small pushing or pulling movements are necessary once the edges of the sleeve 87 have been detected, any inaccuracies in the positioning of the coil 20 along the longitudinal axis of the tube 85 due to the compliance of the nylon push-rod 69 are negligible.

I claim as my invention:

1. A process for using a heater assembly as an eddy current probe with an elongated, electrically conductive conduit in order to position the heater assembly adjacent to a selected section of the conduit prior to the heating thereof, wherein said heater assembly includes an electrical resistance heating element, comprising the steps of:
    (a) conducting an alternating current having a frequency of between about 10 to 10,000 kHz through the electrical resistance heating element in order to induce eddy currents in the conduit;
    (b) moving the heater assembly along the longitudinal axis of the conduit while monitoring changes in the impedance of the electrical resistance heating element in order to properly position the heating element with respect to said conduit, and
    (c) conducting a heat-producing current through said electrical heating element in order to generate and apply radiant heat onto said selected section.

2. The process of claim 1, wherein the conduit is a metallic sleeve, and wherein the electrical resistance heating element includes an elongated coil of electrical resistance wire that is wound so that adjacent coil windings do not come into contact with one another.

3. The process of claim 2, wherein the sleeve includes expanded portions on either end and an unexpanded portion in its middle.

4. The process of claim 3, further including the step of locating the edges of the expanded portions of the sleeve by noting the position of the coil along the longitudinal axis of the sleeve when the coil impedance attains its first and its last local maximum values.

5. The process of claim 2, wherein the heating assembly includes an elongated mandrel having a centrally disposed cylindrical section, and wherein the coil of electrical resistance wire is wound around this cylindrical section.

6. The process of claim 2, wherein the longitudinal axis of the heater assembly is oriented parallel to the longitudinal axis of the sleeve as the heater assembly is moved through the sleeve.

7. The process of claim 2, wherein the coil of electrical resistance wire is formed from an alloy containing between about 70% to 90% platinum and 30% to 10% rhodium.

8. The process of claim 2, wherein the frequency of the alternating current conducted through the coil is between about 500 to 5,000 kHz.

9. The process of claim 2, wherein the frequency of the alternating current conducted through the coil is between about 900 to 990 kHz.

10. The process of claim 2, wherein the coil includes between about 75 to 100 windings of wire formed from an alloy consisting of platinum and rhodium.

11. A process of using a heater assembly having an electrical resistance heating coil to position the coil adjacent to a selected section of an elongated metallic structure which is adjacent to and parallel with a conduit, and to heat said section of said structure, wherein said conduit is elongated in a direction X, comprising the steps of:
   (a) moving the heater assembly through the conduit and through the vicinity of the structure with the axis of rotation of the coil oriented substantially parallel to the longitudinal axis of the conduit while conducting an alternating current having a frequency of between about 100 to 10,000 kHz through the electrical resistance heating coil in order to induce eddy currents in the elongated metallic structure;
   (b) monitoring the changes in impedance in the electrical resistance heating coil resulting from the eddy currents induced in the elongated metallic structure as a function of the position of the electrical resistance heating coil along the longitudinal axis X of said conduit;
   (c) locating the proximal and distal edges of the structure by noting the position of the electrical resistance heating coil along the longitudinal X of the conduit when the coil impedance achieves its first and last local maximum values;
   (d) positioning said coil adjacent to said selected section of said structure by referring to the positions of the proximal and distal edges of the structure, and
   (e) conducting a heat-producing current of electricity through said coil in order to apply radiant heat to said section of said structure.

12. The process of claim 11, wherein the coil of electrical resistance wire is formed from an alloy containing between about 70% to 90% platinum and 30% to 10% rhodium.

13. The process of claim 11, wherein the frequency of the alternating current conducted through the coil is between about 900 to 990 kHz.

14. The process of claim 11, wherein the coil includes between about 75 to 100 windings of wire formed from an alloy consisting of platinum and rhodium.

15. A process for using a heater assembly having an electrical resistance heating coil to locate the edges of an elongated metallic sleeve circumscribed by at least one ring of brazing material within a tube having a longitudinal axis X in order that the coil may be positioned to accurately apply a brazing heat across selected longitudinal sections of the sleeve, comprising the steps of:
   (a) moving the heater assembly through the tube and through the proximal end of the sleeve with the axis of rotation of the coil oriented substantially parallel to the longitudinal axis X of the tube while conducting an alternating current having a frequency of between about 100 to 10,000 kHz through the electrical resistance heating coil in order to induce eddy current sin the metallic sleeve;
   (b) monitoring the changes in impedance in the electrical resistance heating coil resulting from the eddy currents induced in the proximal end of the sleeve as a function of the position of the electrical resistance heating coil along the longitudinal axis X of the tube;
   (c) locating the proximal edge of the sleeve by noting the position of the electrical resistance heating coil along the longitudinal axis X of the tube when the coil impedance achieves its first local maximum value;
   (d) moving the heater assembly along the longitudinal axis X of the tube a first selected distance from the proximal edge of the sleeve so that the electrical heating coil is adjacent to a first longitudinal section of the sleeve which is not circumscribed by a ring of brazing material;
   (e) connecting said electrical resistance coil to a heat-producing current of electricity so that said coil applies enough radiant heat to said first longitudinal section of the tube which surrounds the sleeve to thermally expand said first longitudinal section;
   (f) moving the heater assembly along the longitudinal axis X of the tube a second selected distane from the proximal edge of the sleeve so that the heating coil is adjacent to a second longitudinal section of the sleeve which is circumscribed by a ring of brazing material;
   (g) heating said second longitudinal section with enough radiant heat from the heating coil so that the brazing material melts and forms a braze joint between the tube and the proximal end of the sleeve.

16. The process of claim 15, further including the steps of:
   (h) disconnecting said electrical resistance coil from said heat-producing current of electricity;
   (i) moving the heater assembly through the distal end of the sleeve with the axis of rotation of the coil oriented substantially parallel to the longitudinal axis X of the tube while conducting an alternating current having a frequency of between about 100 to 10,000 kHz through the electrical resistance heating coil in order to induce eddy currents in the metallic sleeve;
   (j) monitoring the changes in impedance in the electrical resistance heating coil resulting from the eddy currents induced in the distal end of the sleeve as a function of the position of the electrical resistance heating coil along the longitudinal axis X of the tube;
   (k) locating the distal edge of the sleeve by noting the position of the electrical resistance heating coil along the longitudinal axis X of the tube when the coil impedance achieves its first local maximum value;

(l) moving the heater assembly along the longitudinal axis X of the tube a first selected distance from the distal edge of the sleeve so that the electrical heating coil is adjacent to a third longitudinal section of the sleeve which is not circumscribed by a second ring of brazing material;

(m) connecting said electrical resistance coil to a heat-producing current of electricity so that said coil applies enough radiant heat to said third longitudinal section of the tube which surrounds the sleeve to thermally expand said third longitudinal section;

(n) moving the heater assembly along the longitudinal axis X of the tube a second selected distance from the distal edge of the sleeve so that the heating coil is adjacent to a fourth longitudinal section of the sleeve which is circumscribed by a second ring of brazing material;

(o) heating said fourth longitudinal section with enough radiant heat from the heating coil so that the second ring of brazing material melts and forms a braze joint between the tube and the distal end of the sleeve.

17. The process of claim 16, wherein the coil of electrical resistance wire is formed from an alloy containing between about 70% to 90% platinum and 30% to 10% rhodium.

18. The process of claim 16, wherein the frequency of the alternating current conducted through the coil is between about 500 to 5,000 kHz.

19. The process of claim 16, wherein the frequency of the alternating current conducted through the coil is between about 900 to 990 kHz.

20. The process of claim 16, wherein the coil includes between about 75 to 100 windings of wire formed from an alloy consisting of platinum and rhodium.

21. A radiant heater assembly for selectively applying heat to one or more longitudinal sections of a conduit formed at least in part from an electrically conductive material, comprising:

(a) a coil formed from an electrically conductive material for both generating radiant heat when an electric current of a selected magnitude is conducted therethrough, and for transmitting a time-varying electromagnetic field through the electrically conductive material when an alternating current within a selected frequency range is conducted therethrough;

(b) means selectively connecting the coil to an electric current of said selected magnitude and an alternating current within said selected frequency range;

(c) means moving the coil along the longitudinal axis X of the conduit when said coil is connected to an alternating current within said selected frequency range, and (d) means monitoring changes in the impedance of the coil to the alternating current flowing therethrough which result from electromagnetic coupling between the time-varying electromagnetic field generated by the coil from the alternating current and the electrically conductive material present in said conduit.

22. The radiant heater assembly of claim 21, wherein said coil is formed from wire made from an alloy which includes platinum and rhodium.

23. The radiant heater assembly of claim 21, wherein said conduit is a metallic sleeve.

24. The radiant heater assembly of claim 21, wherein the frequency of the alternating current is between about 100 to 10,000 kHz.

25. The radiant heater assembly of claim 21, wherein the frequency of the alternating current is between about 500 to 5,000 kHz.

26. The radiant heater assembly of claim 21, wherein the frequency of the alternating current is between about 900 to 990 kHz.

27. The radiant heater assembly of claim 21, wherein said means monitoring changes in the impedance of the coil is an eddy current detector.

28. A radiant heater assembly for selectively applying heat to one or more sections of a metallic sleeve disposed within a tube that is elongated along an axis X in order to braze said sleeve to said tube, comprising:

(a) a coil for both applying radiant heat to a selected longitudinal section of a sleeve when an electric current of a selected magnitude is conducted therethrough, and for serving as an eddy current probe when an alternating current within a selected frequency range is conducted therethrough wherein said coil is elongated and is wound so that adjacent coil windings do not come into contact with one another;

(b) switching means for selectively connecting the coil to an electric current of said selected magnitude, and for connecting the coil to an alternating current within said frequency range, wherein said switching means disconnects the coil from the current of said selected magnitude whenever the coil is connected to the alternating current;

(c) means moving the coil along the longitudinal axis X of the sleeve with the axis of rotation of the coil substantially parallel to the longitudinal axis X of the sleeve when the coil is connected to an alternating current within said selected frequency range, and (d) eddy current detection circuitry for monitoring changes in the coil impedance to the alternating current flowing therethrough which result from the generation of eddy currents in the metallic sleeve.

\* \* \* \* \*